March 4, 1930.                    M. MORRILL                    1,749,256
                          AIRPLANE CONTROL MECHANISM
                          Filed Feb. 15, 1926        2 Sheets-Sheet 1
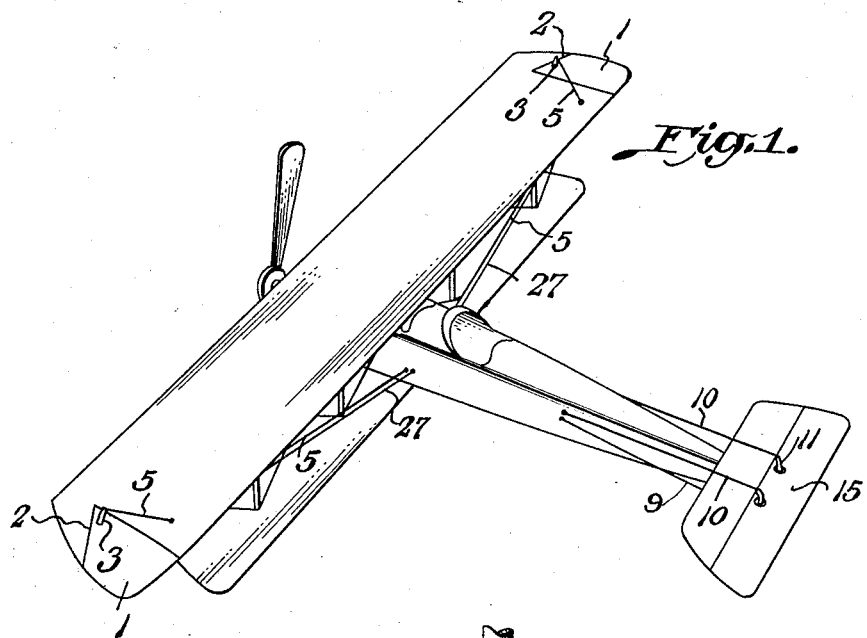
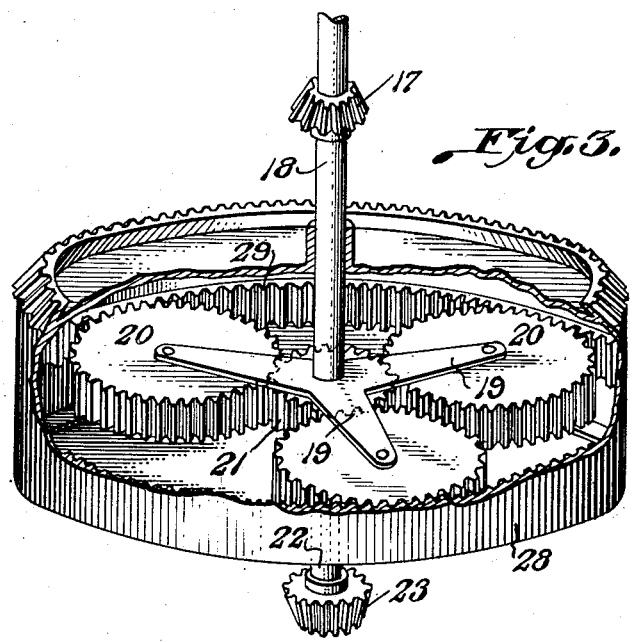
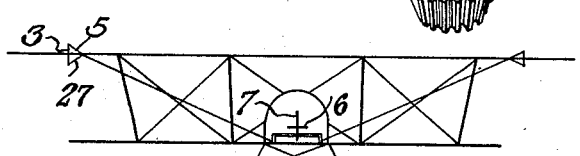
Milo Morrill
Inventor:
Murray O. Hayes
Atty March 4, 1930. M. MORRILL 1,749,256
AIRPLANE CONTROL MECHANISM
Filed Feb. 15, 1926  2 Sheets-Sheet 2
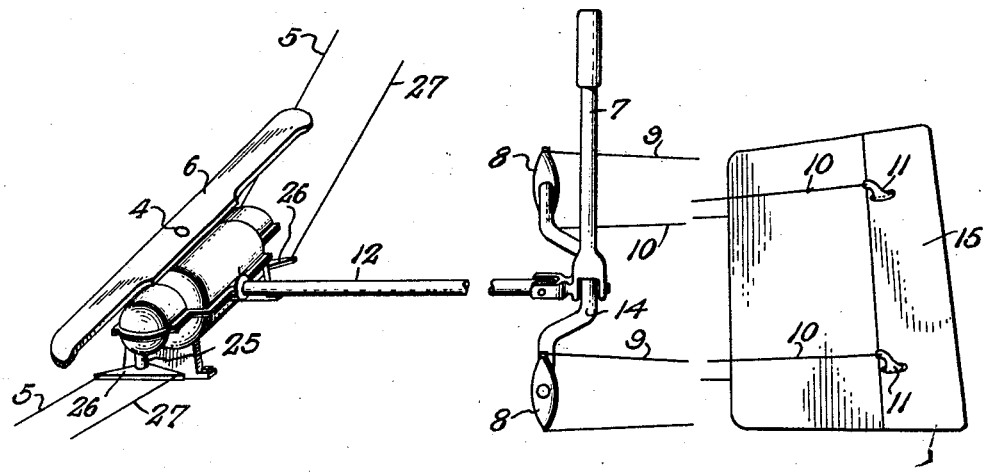
Fig. 2.
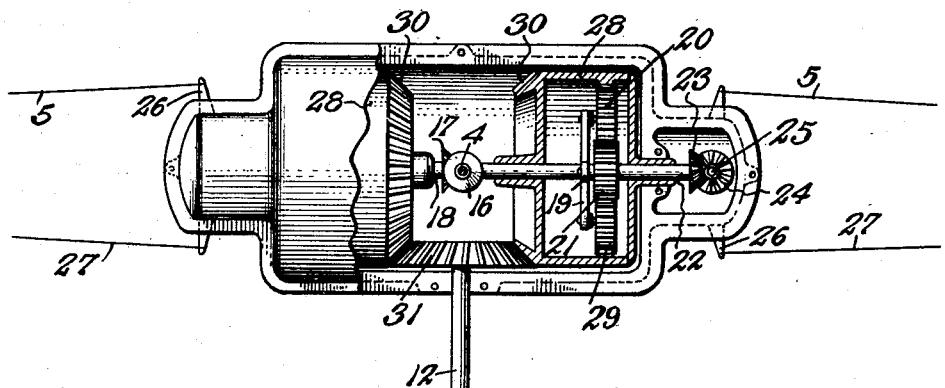
Fig. 4.
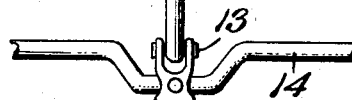
Milo Morrill
Inventor:
by Murray O. Hayes
Atty.

Patented Mar. 4, 1930

1,749,256

UNITED STATES PATENT OFFICE

MILO MORRILL, OF PROVO, UTAH; JESSE J. MORRILL ADMINISTRATOR OF SAID MILO MORRILL, DECEASED

AIRPLANE CONTROL MECHANISM

Application filed February 15, 1926. Serial No. 88,349.

This invention relates to a new and novel controlling device for airplanes.

Great strides in aerial navigation have been made in the last few years, and the machines now in use are safe as compared with those of a few years ago, yet even the best leave much to be desired as regards stability and response to manipulation of controls in certain situations.

There are serious objections to the use of ailerons to control an airplane.

It was found by early experimenters in this art that when a turn was attempted by warping the wing that although the machine banked in the desired direction the drag on the warped wing was so strong that the machine turned in the direction opposite to that which it was banked for, and consequently it was necessary to use a rudder to overcome the drag thus produced. Ailerons are merely an adaptation of the principles of warping the wing which permits of a more rigid wing construction. It is to avoid this unnecessary strain on the mechanism, difficulty of turning and inefficient consumption of power, that I have devised the subject of this application.

With the above considerations and others in mind, I have made my invention, which has for its objects:

First: To devise airplane controls of a type that shall obviate the necessity of a rudder and ailerons.

Second: To devise controls which may be varied to provide different degrees of inherent stability.

Third: To make a device of the type set forth above which shall be readily applicable to almost any of the existing types of airplanes.

Fourth: To make a device as set forth which shall be of such small cost as to go into universal use.

In the drawings:

Fig. 1 shows an airplane equipped with my invention;

Fig. 2 is a view showing the control mechanism;

Fig. 3 is a detail of one portion of the control mechanism;

Fig. 4 is a view showing the relation among various parts of the control mechanism;

Fig. 5 is a diagrammatic view to show the relation of the control wire to the other parts of the device.

The numeral 1 indicates what I term my movable tip, which is of practically the same construction as that ordinarily employed in the planes.

These tips are of small area as compared with the planes and are preferably so mounted that two sides of each conform to the end line and rear edge line of the plane. When used on a machine having more than one plane they are always used on the uppermost of the said planes.

The tips are hinged along the lines 2, these lines being at an angle to the front edge of the plane, the degree of angularity being governed by the inherent stability desired in the machine, as the greater that angle the greater will be the stability.

It is not desirable to have the airplane too stable as that decreases its maneuverability and makes it practically a fair weather machine only. An angle of fifteen to twenty degrees is desirable for general use as it gives a high degree of both stability and responsiveness.

Each tip 1 is provided with a horn 3 on each surface to which the control wires 5 are attached; these wires must extend at right angles to the hinge line 2.

As is usual in present-day airplanes, I manipulate the controls by means of a foot-bar 6 and stick 7, the former serving to move both tips in the same direction simultaneously, and the latter when moved from side to side moving the said tips in opposite directions; these two movements are accomplished entirely independently of each other, i. e. when set to any degree of tilt in opposite directions both tips may be moved equally in the same direction, still maintaining their previous angular relation to each other.

When stick 7 is moved forward and back the arms 8 are caused to rotate, thus moving wires 9 and 10 which are secured to horns 11 on the elevator 15; these wires are crossed.

The shaft 12 connects the stick 7 with the tip manipulating mechanism; the joint 13 by which 12 is so connected to 7 as to allow forward and back movement of the stick must have its pivotal center accurately in the same line as the pivotal center of the shaft 14. However, this construction is well known in present day airplanes.

The foot board 6 is mounted upon a shaft 4 which carries upon its lower end the bevel gear 16, which meshes with gear 17 which is keyed upon shaft 18.

The shaft 18 carries on each end a spider, on each arm 19 of which is mounted a planetary toothed gear 20, as shown in Fig. 3. Engaged by each of the toothed gears 20 is a sun pinion 21 on a shaft 22 upon which is keyed bevel gear 23 which engages a bevel gear 24 mounted on a shaft 25 which is preferably not at right angles to shaft 22 but diagonal thereto and carries the arm 26 to which are secured the tip control wires 5 and 27. These wires pass through pulleys properly placed to insure perfect freedom of operation of the said wires.

The casing 28 has an internal gear 29 meshed with gears 20 and an external gear 30, and is rotatably journalled on the shafts 18 and 22.

A bevelled gear 31 is keyed on shaft 12 and is in mesh with the gears 30; thus sidewise movement of stick 7 will cause 31 to rotate which will drive casings 28.

The operation of my device is as follows:
Suppose the aviator to be sitting back of stick 7 facing foot-board 6. If he move the stick toward his right, gear 31 will be given a clockwise rotation as seen from the seat. This will cause the casing 28 on the operator's right to rotate in a clockwise direction, that on his left in a counter-clockwise sense as viewed from the left hand end of the mechanism, and thus the tips will be moved in opposite directions. The pressure of the air against that tip which is depressed below the plane will exert a lifting force on that end of the plane, while the one on the other end of the plane will be raised above the plane and the air pressure will tend to force it down and will also cause a drag on it and consequently the machine will bank and turn.

The preferred manipulation for turning is as follows:

The stick 7 is moved in the proper lateral direction to raise above the line of flight the tip on the side toward which it is desired to turn, which also depresses the other tip below the line of flight; the foot bar 6 is then pushed to bring up into the line of flight the tip which was depressed and at the same time raise the other tip still higher. The air pressure on the raised tip will force that end of the plane down and bank the machine, while at the same time the drag on that tip will complete the turn. Thus the undesirable effects of the ailerons in turning, as pointed out above, is eliminated.

It is thus apparent that I have devised a mechanism for steering an airplane without a rudder. Model machines thus equipped show exceptionally high responsiveness when too much inherent stability is not built into them as set forth above.

To steer the plane when running on the ground to take off I provide a brake for each wheel, a means in use and well known in the art.

The term "end of the plane" as used in this specification and the claims hereto appended is not employed in a narrow sense as applying only to the terminal bounding portions of the plane but broadly to designate an area adjacent to the longitudinal extremities thereof as well as the said boundary portions.

I claim:

1. An airplane control operating mechanism comprising in combination, a manually operated member, a shaft rotatable by said member, a gear wheel on said shaft, a casing provided with internal and external series of gear teeth, the said external series meshing with the gear on the shaft aforesaid, a second shaft upon which the said casing is mutually rotatable, gears mounted upon the ends of said second shaft and engaging the internal gearing of said casing, jack shafts each of which bears a gear engaged by the gears upon the said second shaft and another gear upon each of said jack shafts, the last named gears engaging other gears which actuate arms, the said arms being operatively connected to movable parts of the airplane.

2. A control operating mechanism as set forth in claim 1 having a gear mounted upon the intermediate portion of said second shaft, another gear engaging the said gear on said shaft, the second of said gears being operatively connected to means actuated by the feet of the operator.

MILO MORRILL.